United States Patent
Ko et al.

(10) Patent No.: US 10,586,975 B2
(45) Date of Patent: Mar. 10, 2020

(54) ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si Gyeonggi-do (KR)

(72) Inventors: Youngsan Ko, Yongin-si (KR); Minjae Kim, Yongin-si (KR); Junsik Lee, Yongin-si (KR); Chaewoong Cho, Yongin-si (KR); Kijun Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 108 days.

(21) Appl. No.: 15/695,503

(22) Filed: Sep. 5, 2017

(65) Prior Publication Data
US 2018/0069229 A1 Mar. 8, 2018

(30) Foreign Application Priority Data
Sep. 6, 2016 (KR) .................. 10-2016-0114628

(51) Int. Cl.
| | |
|---|---|
| *H01M 10/0525* | (2010.01) |
| *H01M 4/133* | (2010.01) |
| *H01M 4/134* | (2010.01) |
| *H01M 4/587* | (2010.01) |
| *H01M 4/62* | (2006.01) |
| *H01M 4/04* | (2006.01) |
| *H01M 4/136* | (2010.01) |
| *H01M 10/052* | (2010.01) |
| *H01M 4/02* | (2006.01) |

(52) U.S. Cl.
CPC ......... *H01M 4/133* (2013.01); *H01M 4/0404* (2013.01); *H01M 4/134* (2013.01); *H01M 4/136* (2013.01); *H01M 4/587* (2013.01); *H01M 4/62* (2013.01); *H01M 4/622* (2013.01); *H01M 4/625* (2013.01); *H01M 10/0525* (2013.01); *H01M 10/052* (2013.01); *H01M 2004/021* (2013.01); *H01M 2300/0034* (2013.01)

(58) Field of Classification Search
CPC ...... H01M 4/133; H01M 4/134; H01M 4/136; H01M 4/587; H01M 4/62; H01M 4/622; H01M 4/625; H01M 2004/021; H01M 2004/027; H01M 10/052; H01M 10/0525; H01M 2300/0034
See application file for complete search history.

(56) References Cited

U.S. PATENT DOCUMENTS

| | | | | |
|---|---|---|---|---|
| 2012/0244431 | A1* | 9/2012 | Tani | H01M 4/133 429/211 |
| 2015/0086875 | A1* | 3/2015 | Yoshida | H01M 10/052 429/322 |
| 2015/0203722 | A1* | 7/2015 | Yoshida | H01M 4/621 429/212 |

FOREIGN PATENT DOCUMENTS

| | | |
|---|---|---|
| JP | 2015-088333 A | 5/2015 |
| KR | 2012-0040223 A | 4/2012 |
| KR | 2014-0032624 A | 3/2014 |

* cited by examiner

*Primary Examiner* — Brittany L Raymond
(74) *Attorney, Agent, or Firm* — Lee IP Law, PC

(57) ABSTRACT

An electrode for a rechargeable lithium battery includes a current collector, an electrode active material layer on at least one surface of the current collector, a carbon-based coating layer between the current collector and the electrode active material layer, the carbon-based coating layer being formed from a carbon-based slurry including a carbon-based material, a first binder, and a thickener. A content of the first binder is about 35 wt % to about 70 wt % based on the carbon-based coating layer.

11 Claims, 3 Drawing Sheets

ELECTRODE FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2016-0114628, filed on Sep. 6, 2016, in the Korean Intellectual Property Office, and entitled: "Electrode for Rechargeable Lithium Battery and Rechargeable Lithium Battery Including Same," is incorporated by reference herein in its entirety.

BACKGROUND

1. Field

Embodiments relate to an electrode for a rechargeable lithium battery and a rechargeable lithium battery including the same.

2. Description of the Related Art

A rechargeable lithium battery may be operated for a long lifetime. A rechargeable lithium battery may have a high driving voltage and high energy density and thus may satisfy various requirements with regard diversification and combination of devices. An effort has been actively made to expand the application of rechargeable lithium batteries to power storage and the like as well as to electrical vehicles through general rechargeable lithium battery technology.

SUMMARY

Embodiments are directed to an electrode for a rechargeable lithium battery including a current collector, an electrode active material layer on at least one surface of the current collector, a carbon-based coating layer between the current collector and the electrode active material layer, the carbon-based coating layer being formed from a carbon-based slurry including a carbon-based material, a first binder, and a thickener. A content of the first binder is about 35 wt % to about 70 wt % based on the carbon-based coating layer.

The first binder may include at least one selected from a styrene-butadiene rubber, a styrene-butyl acrylate copolymer, and a styrene-(meth)acryl ester copolymer.

The electrode may be a negative electrode.

A content ratio of the carbon-based material and the first binder may be about 1:0.5 to about 1:1.9.

A glass transition temperature of the first binder may be about −40° C. to about 20° C.

The carbon-based material may be at least one selected from graphite, carbon black, acetylene black, ketjen black, channel black, furnace black, lamp black, thermal black, a carbon fiber, and carbon fluoride.

The thickener may be at least one selected from carboxymethyl cellulose (CMC), polyvinyl alcohol (PVA), sodium polyacrylate (Na-PA).

A content of the thickener may be about 3 wt % to about 10 wt % based on the carbon-based coating layer.

A polymerization degree of the thickener may be about 1000 to about 1800.

A substitution degree of the thickener may be about 0.5 to about 1.2.

A thickness of the carbon-based coating layer may be about 0.05 μm to about 3 μm.

The electrode active material layer may include a second binder. The first binder and the second binder may be the same material.

Embodiments are also directed to a rechargeable lithium battery including a positive electrode, a negative electrode, and an electrolyte solution. The negative electrode is an electrode as described above.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
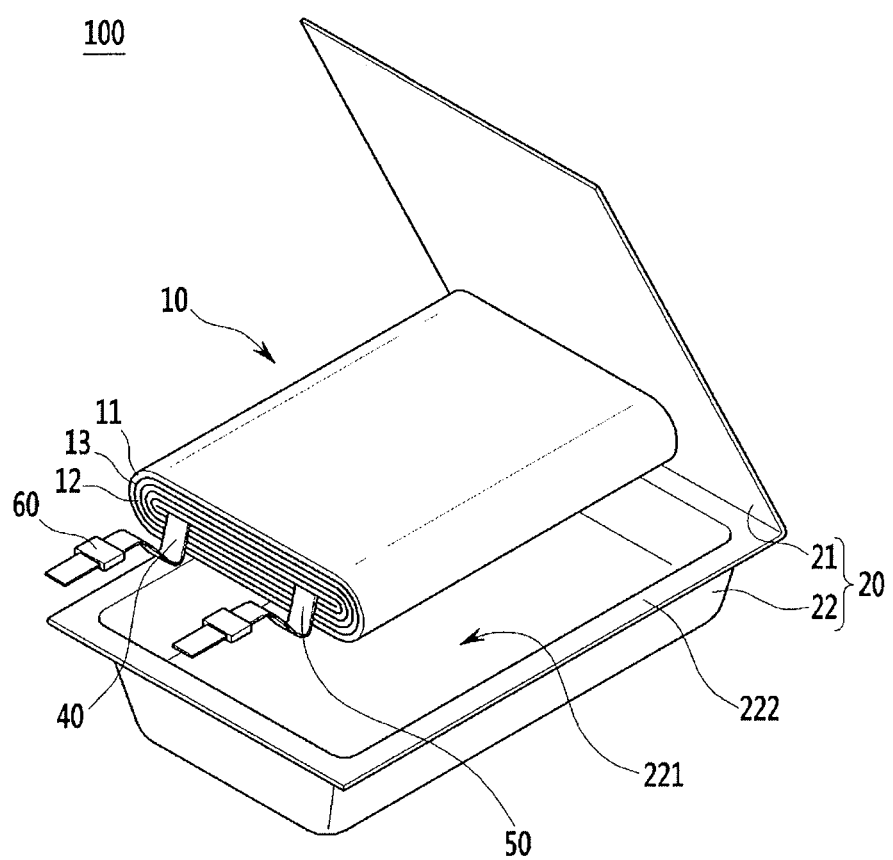
FIG. 1 illustrates a schematic view showing a rechargeable lithium battery according to an example embodiment of this disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration.

An electrode for a rechargeable lithium battery according to an example embodiment may include a current collector, an electrode active material layer disposed on at least one surface of the current collector, and a carbon-based coating layer disposed between the current collector and the electrode active material layer. The carbon-based coating layer may be formed from a carbon-based slurry including a carbon-based material, a first binder, and a thickener.

First, the carbon-based slurry for the carbon-based coating layer is described.

In the present disclosure, a content of the first binder in the carbon-based coating layer may be about 35 wt % to about 70 wt % based on the carbon-based coating layer. For example, a content of the first binder may be about 40 wt % to about 70 wt % or, for example, about 45 wt % to about 65 wt %. When the content of the first binder is greater than or equal to about 35 wt %, uniformity of an electrode plate may be improved, and thus, resistance of the electrode plate may become uniform. When the content of first binder is about 70 wt % or less, deterioration of high-rate charge/discharge characteristics of the rechargeable lithium battery may be avoided.

The first binder may play a role of an adhesive between the conductive material of the electrode active material and a carbon-based coating layer. The first binder may be or include, for example, at least one selected from a styrene-butadiene rubber, a styrene-butyl acrylate copolymer, and a styrene-(meth)acryl ester copolymer.

For example, the first binder may be or include styrene-butadiene rubber.

When the first binder is a polymer including styrene, excellent contact interface adherence between the current collector and the electrode active material layer may be obtained. In addition, impregnation strength of an electrolyte solution may be improved, and issues of swelling of the rechargeable lithium battery at a high temperature, a sharply deteriorated cycle life, deterioration of heat resistance and adherence of the electrode player, etc. that could arise if other polymers such as a fluorine-based acrylate or a polyolefin-based polymer were to be used may be avoided.

A glass transition temperature (Tg) of the first binder may be about −40° C. to about 20° C., or, for example, about −10° C. to about 10° C. When the glass transition temperature of the first binder is within the range, an advantage in terms of a process may be obtained. For example, when the glass transition temperature of the first binder is greater than or equal to about −40° C., a detachment defect, or the like, of the carbon-based material layer may be prevented. When the glass transition temperature of the first binder is less than or equal to about 20° C., a compression process may be smoothly performed.

A content ratio of the carbon-based material and the first binder may be, for example, about 1:0.5 to 1:1.9, or, for example, about 1:0.6 to 1:1.8. When the content ratio of the carbon-based material and the first binder is within the range, interface resistance between the carbon-based coating layer and the electrode active material layer may be remarkably reduced. In addition, the carbon-based coating layer may be easily formed, and uniformity of the carbon-based coating layer may also be improved.

The carbon-based material may be, for example, at least one selected from graphite, carbon black, acetylene black, ketjen black, channel black, furnace black, lamp black, thermal black, a carbon fiber, and carbon fluoride.

In addition, the carbon-based material may be, for example, sheet-shaped, spherical-shaped, amorphous, or a combination of two or more.

The thickener may be, for example, at least one selected from carboxymethyl cellulose (CMC), polyvinyl alcohol (PVA), sodium polyacrylate (Na-PA).

A content of the thickener may be about 3 wt % to about 10 wt %, or, for example, about 4 wt % to about 7 wt % based on the carbon-based coating layer. When the content of the thickener is greater than or equal to about 3 wt %, the carbon-based slurry may be easily prepared. When the content of the thickener is less than or equal to about 10 wt %, resistance of the electrode may be reduced, and thus characteristics of the rechargeable lithium battery may be improved.

A substitution degree of the thickener may be about 0.5 to about 1.2, or, for example, about 0.6 to about 1. When the substitution degree of the thickener is within the range, the carbon-based slurry may be easily prepared, and adherence to the electrode plate may be improved.

The term "substitution degree" in the present specification may refer to a carboxymethylization substitution degree to which a hydrophilic sodium carboxymethyl group (—CH$_2$COONa) is substituted for hydroxyl (—OH) of cellulose to apply water-solubility to the thickener.

A thickness of the carbon coating layer formed at at least one surface of the current collector may be, for example, in a range of about 0.05 μm to about 3 μm, or, for example, about 0.5 μm to about 1 μm. When the thickness of the carbon coating layer is greater than or equal to about 0.05 μm, interface resistance may be effectively controlled. When the thickness of the carbon coating layer is less than or equal to about 3 μm, a rechargeable lithium battery having excellent energy density may be realized.

Accordingly, the carbon-based coating layer may include a carbon-based material, a first binder, and a thickener. The first binder may be included in an amount of about 35 wt % to about 70 wt % based on the total weight of the carbon-based slurry.

The electrode for a rechargeable lithium battery may include includes a current collector and a carbon-based coating layer formed by using the above carbon-based slurry on at least one surface of the current collector and between the current collector and an electrode active layer.

The electrode for a rechargeable lithium battery may be a negative electrode. In this case, the current collector may be a negative current collector and the electrode active material layer may be a negative active material layer.

The negative current collector may be, for example, a copper foil, a nickel foil, a stainless steel foil, a titanium foil, a nickel foam, a copper foam, a polymer substrate coated with a conductive metal, or a combination thereof.

The negative active material layer disposed on at least one surface of the negative current collector may be formed from a negative electrode slurry including a negative active material and a negative conductive material.

The negative active material may be a carbon-based material in which lithium ions are easily intercalated and deintercalated. Thus, high-rate charge and discharge characteristics may be improved.

The carbon-based material may be crystalline carbon or amorphous carbon.

Examples of the crystalline carbon may include graphite.

Examples of the amorphous carbon may include soft carbon (low temperature fire carbon) or hard carbon, a mesophase pitch carbonized product, fired coke, or the like. For example, the carbon-based material may be soft carbon.

The soft carbon may be graphitizable carbon in which atoms are aligned to easily form a layered structure. The layered structure may be easily changed into a graphite structure when heat-treated by increasing a temperature. The soft carbon may have a disordered crystal structure compared with graphite, but may be less disordered than hard carbon. Compared to graphite, soft carbon may have more gates that facilitate the entry and exit of ions, so that the ions may be easily diffused. For example, the carbon-based material may be low crystalline soft carbon.

A content of the negative active material may be in a range of about 70 wt % to about 99 wt %, or, for example, about 80 wt % to about 98 wt % based on the total weight of negative electrode slurry.

The carbon-based material may have a suitable shape such as a shape of a sphere, a sheet, a flake, a fiber, a needle, or the like.

The negative electrode slurry may include a negative conductive material.

The negative conductive material may be included to provide electrode conductivity. A suitable electrically conductive material that does not cause a chemical change may be used as a conductive material. Examples thereof include a carbon-based material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative; or a mixture thereof.

The content of the negative conductive material may be appropriately adjusted depending on a kind and a content of the negative active material. For example, a content of the negative conductive material may be about 1.5 wt % to about 40 wt %, or, for example, about 1 wt % to about 30 wt % or, for example, about 2 wt % to about 20 wt %.

In the present disclosure, the negative electrode slurry may include about 70 wt % to about 98 wt % of the negative active material and about 1.5 wt % to about 40 wt % of the negative conductive material based on the total weight of the negative electrode slurry.

As desired, the negative electrode slurry may further include a second binder.

The second binder may improve binding properties of negative active material particles with one another and with a current collector. The second binder may be, for example, polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The second binder, included in negative electrode slurry, may be, for example, the same as the first binder included in the composition for a carbon coating layer. Herein, adherence among layers of the electrode may be improved due to excellent affinity among the layers of the electrode.

A rechargeable lithium battery according to the present specification may include a separator, an electrode positioned on a first surface of the separator, and a positive electrode on the opposite surface, for example, a second surface, of the separator.

FIG. 1 illustrates a schematic view showing a rechargeable lithium battery according to an example embodiment.

Referring to FIG. 1, a rechargeable lithium battery 100 according to an example embodiment may include a case 20, an electrode assembly 10 in the case 20, and a positive terminal 40 and a negative terminal 50 that are electrically connected to the electrode assembly 10.

The electrode assembly 10, as shown in FIG. 1, may have a structure obtained by interposing a separator 13 between band-shaped positive and negative electrodes 11 and 12, winding them, and compressing the wound separator 13, and positive and negative electrodes 11 and 12 into a flat shape. In some implementations, a plurality of quadrangular sheet-shaped positive and negative electrodes may be alternatively stacked with a plurality of separator therebetween.

The case 20 may include a lower case 22 and an upper case 21. The electrode assembly 10 may be housed in an internal space 221 in the lower case 22.

After housing the electrode assembly 10 in the case 20, the upper case 21 and the lower case 22 may be sealed by applying a sealant on a sealing region 222 along the edge of the lower case 22. Durability of the rechargeable lithium battery 100 may be improved by using an insulation member 60 to wrap a region where the positive and negative terminals 40 and 50 contact the case 20.

The positive electrode 11, the negative electrode 12, and the separator 13 may be impregnated in an electrolyte solution.

The electrode for a rechargeable lithium battery as described above may be the negative electrode 12. Accordingly, a detailed description of the negative electrode 12 will not be repeated.

The positive electrode may include a positive current collector layer and a positive active material layer disposed on at least one surface of the positive current collector layer.

The positive current collector layer may support a positive active material. The positive current collector layer may be, for example, an aluminum foil, a nickel foil, or a combination thereof.

In the positive active material layer, a content of the positive active material may be about 90 wt % to about 98 wt % based on the total weight of the positive active material layer.

The positive active material may include a compound (for example, a lithiated intercalation compound) that is capable of intercalating and deintercalating lithium.

For example, one or more composite oxides of a metal selected from cobalt, manganese, nickel, and a combination thereof, and lithium may be used. For example, the compounds represented by one of the following chemical formulae may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$)

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed by using these elements in the compound in a suitable method having no adverse influence on properties of a positive active material. For example, the method may include a suitable coating method such as spray coating, dipping, or the like.

In an embodiment, the positive active material layer may include a binder and a conductive material. The content of each of the binder and the conductive material may be about 1 wt % to about 5 wt % based on the total weight of the positive active material layer.

The binder may improve binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to provide electrode conductivity. A suitable electrically conductive material that does not cause chemical change may be used as a conductive material. Examples of the conductive material may include a carbon-based material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative; or a mixture thereof.

The separator 13 may be a suitable separator for use in a lithium battery to separate a positive electrode 11 and a negative electrode 12 and provide a transporting passage for lithium ions. The separator 13 may have low resistance to ion transport and excellent impregnation for an electrolyte solution. The separator 13 may be selected from, for example, a glass fiber, polyester, polyethylene, polypropylene, polytetrafluoroethylene, or a combination thereof. The separator 13 may have a form of a non-woven fabric or a woven fabric. For example, in a rechargeable lithium battery, a polyolefin-based polymer separator such as polyethylene and polypropylene may be used. In order to ensure the heat resistance or mechanical strength, a coated separator including a ceramic component or a polymer material may be used. In some implementations, the separator 13 may have a mono-layered or multi-layered structure.

The electrolyte may include a non-aqueous organic solvent and a lithium salt.

The non-aqueous organic solvent may serve as a medium for transmitting ions taking part in the electrochemical reaction of a battery.

The non-aqueous organic solvent may be selected from a carbonate-based, ester-based, ether-based, ketone-based, alcohol-based, and aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone, or the like. The alcohol-based solvent may include ethyl alcohol, isopropyl alcohol, or the like. Examples of the aprotic solvent may include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance.

The carbonate-based solvent may include a mixture with a cyclic carbonate and a linear carbonate. The cyclic carbonate and linear carbonate may be mixed together in a volume ratio of about 1:1 to about 1:9. When the mixture is used as an electrolyte, the solvent may have enhanced performance.

The non-aqueous organic solvent may further include an aromatic hydrocarbon-based organic solvent in addition to the carbonate based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

[Chemical Formula 1]

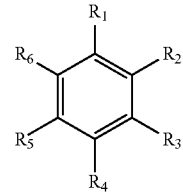

In Chemical Formula 1, $R_1$ to $R_6$ may be the same or different and may be selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include an additive of vinylene carbonate, an ethylene carbonate-based compound represented by Chemical Formula 2, or propanesultone to improve a cycle life.

[Chemical Formula 2]

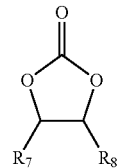

In Chemical Formula 2, $R_7$ and $R_8$ may be the same or different and may be independently selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate range.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, and $LiB(C_2O_4)_2$ (lithium bis(oxalato)borate; LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

(1) Preparation of Carbon-Based Slurry

Carbon black as a carbon-based material, styrene-butadiene rubber as a first binder, and CMC as a thickener were used in a ratio shown in Table 1 to prepare slurry. The thickener had a polymerization degree of 1200 and a substitution degree of 1.

(2) Manufacture of Negative Electrode

Graphite, styrene-butadiene, and CMC in a weight ratio of 98:1:1 were added to water as a solvent to prepare negative electrode slurry.

The carbon-based slurry prepared in (1) above was coated onto a copper foil (Cu foil) and dried to form a 1 μm-thick carbon-based coating layer. Subsequently, the negative electrode slurry was coated on the carbon-based coating layer and then dried and compressed to manufacture a negative electrode.

(3) Manufacture of Rechargeable Lithium Battery Cell $LiCoO_2$, polyvinylidene fluoride, and carbon black in a weight ratio of 96:2:2 were added to N-methylpyrrolidone (NMP) as a solvent to prepare positive electrode slurry. The positive electrode slurry was coated onto an aluminum (Al) foil and then dried and compressed to manufacture a positive electrode.

An electrolyte solution was prepared by mixing ethylene carbonate (EC), ethylmethyl carbonate (EMC), and diethyl carbonate (DEC) in a volume ratio of 3:5:2 and adding 1.15 M $LiPF_6$ thereto.

An electrode assembly was manufactured by interposing a separator between the negative and positive electrodes manufactured according to (2) above, winding the separator, negative electrode and positive electrode, and pressing the wound separator, negative electrode, and positive electrode to be flat. Subsequently, the electrode assembly was housed into a pouch, and the electrolyte solution was injected thereinto to manufacture a rechargeable lithium battery cell.

Examples 2 to 13 and Comparative Examples 1 to 7

A negative electrode was manufactured by using carbon-based slurry according to the same method as Example 1 except for adjusting a weight ratio of the carbon-based material, the first binder, and the thickener as shown in Table 1 and adjusting the polymerization degree and substitution degree of the thickener.

Then, the negative electrode was used to manufacture a rechargeable lithium battery cell according to the same method as Example 1.

TABLE 1

| | Contents of carbon-based material: first binder: thickener | Content ratio of carbon-based material and first binder | Polymerization degree of thickener | Substitution degree of thickener DS |
|---|---|---|---|---|
| Example 1 | 60:35:05 | 1:0.58 | 1200 | 1 |
| Example 2 | 55:40:05 | 1:0.72 | 1200 | 1 |
| Example 3 | 50:45:05 | 1:0.9 | 1200 | 1 |
| Example 4 | 45:50:05 | 1:1.11 | 1200 | 1 |
| Example 5 | 40:55:05 | 1:1.6 | 1200 | 1 |
| Example 6 | 40:60:10 | 1:1.5 | 1200 | 1 |
| Example 7 | 55:40:05 | 1:0.72 | 1000 | 0.9 |
| Example 8 | 55:40:05 | 1:0.72 | 1200 | 1.2 |
| Example 9 | 55:40:05 | 1:0.72 | 1500 | 1 |
| Example 10 | 55:40:05 | 1:0.72 | 1500 | 0.6 |
| Example 11 | 55:40:05 | 1:0.72 | 1100 | 0.9 |
| Example 12 | 40:55:05 | 1:1.6 | 1200 | 0.9 |
| Example 13 | 60:35:05 | 1:0.58 | 1300 | 1 |
| Comparative Example 1 | 50:50:0 | 1:1 | — | — |
| Comparative Example 2 | 70:25:05 | 1:0.35 | 1200 | 1 |
| Comparative Example 3 | 60:20:10 | 1:0.33 | 1200 | 1 |
| Comparative Example 4 | 70:10:20 | 1:0.7 | 1200 | 1 |
| Comparative Example 5 | 20:75:05 | 1:3.75 | 1200 | 1 |
| Comparative Example 6 | 70:20:10 | 1:0.28 | 1500 | 1.2 |
| Comparative Example 7 | 60:30:10 | 1:0.5 | 1800 | 1.2 |

Comparative Example 8

A negative electrode was manufactured according to the same method as Example 1 except for using no carbon-based coating layer. Then, the negative electrode was used to manufacture a rechargeable lithium battery cell.

Reference Example 1

A negative electrode was manufactured by preparing a carbon-based slurry according to the same method as Example 1 except for changing the weight ratio of the carbon-based material, the first binder, and the thickener to be 20:40:20.

Then, a rechargeable lithium battery cell was manufactured according to the same method as Example 1.

Reference Example 2

A negative electrode was manufactured by preparing a carbon-based slurry according to the same method as Example 1 except for changing the weight ratio of the carbon-based material, the first binder, and the thickener to be 55:40:05 and using CMC having a polymerization degree of 2000 and a substitution degree of 0.6 as the thickener.

Subsequently, a rechargeable lithium battery cell was manufactured according to the same method as Example 1.

Experimental Example 1: Electrode Plate Uniformity Test

A scattering degree was calculated by measuring a loading level (mg/cm$^2$) of the negative electrodes according to Examples 1 to 13, Comparative Examples 1 to 7, and Reference Examples 1 to 3. When the loading level had a scattering degree of less than or equal to ±5%, ○ was given, when the loading level had a scattering degree of greater than or equal to ±30%, x was given, and Δ was given for the other cases. The results are shown in Table 2.

Experimental Example 2: Resistance Decrease Rate of Electrode Plate

The negative electrodes according to Examples 1 to 13 and Comparative Examples 1 to 8 were cut into a predetermined size (32 π). Resistance of the cut negative electrodes was measured by using a LCR meter, a model 4294A made by Agilent Technologies Co., Ltd. and then, converted into resistivity.

When a specific resistance decrease rate was greater than or equal to 75% based on resistivity of the negative electrode according to Comparative Example 8, ○ was given, when the resistivity decrease rate was less than or equal to 50% based on specific resistance of the negative electrode according to Comparative Example 8, x was given, and Δ was given for the other cases. The results are shown in Table 2.

Experimental Example 3: Lightness (L*) of Electrode Plate

The negative electrodes according to Examples 1 to 13 and Comparative Examples 1 to 7 were cut into a predetermined size (32 π). Lightness (L*) of the cross sections of the carbon-based coating layers of the cut negative electrodes was measured by using a DP-400 chromameter made by Konica Minolta Inc.

When the lightness (L*) was less than or equal to 25, ○ was given, when the lightness was greater than or equal to 50, x was given, and Δ was given for the other cases. The results are shown in Table 2.

Experimental Example 4: Interlayer Adherence of Negative Electrode Before Coating Active Material Each carbon-based slurry according to Examples 1 to 13 and Comparative Examples 1 to 7 was coated onto a copper foil (Cu foil) and dried to form a 1 μm-thick carbon-based coating layer, and the coated foils were respectively cut into a predetermined size (2 cm×10 cm). Then, a tape was cast on the cut carbon-based coating layer samples and then, peeled off to examine a peeling degree of the carbon-based coating layers.

When the carbon-based coating layer adhered on the tape was less than or equal to 1%, ○ was given, When the carbon-based coating layer adhered on the tape was greater than or equal to 10%, x was given, and Δ was given for the other cases. The results are shown in Table 2.

Experimental Example 5: Interlayer Adherence of Negative Electrode After Coating Active Material Interlayer adherence of the negative electrodes according to Examples 1 to 13 and Comparative Examples 1 to 7 before the compression was measured.

The negative electrodes were cut into a predetermined size (2 cm×10 cm), the cut samples were respectively fixed on a glass substrate with a double-sided adhesive tape, and adherence between the copper foils and the carbon-based coating layers in the samples was measured with a tensile tester (Instron Corp., US).

When a measurement was greater than or equal to 0.8 gf/mm, ○ was given, when the measurement was less than or equal to 0.4 gf/mm, x was given, and Δ was given for all other cases. The results are shown in Table 2.

TABLE 2

| | Electrode plate uniformity | Resistance | L* value | Adherence Before coating active material | Adherence After coating active material |
|---|---|---|---|---|---|
| Example 1 | Δ | ○ | ○ | Δ | Δ |
| Example 2 | ○ | ○ | ○ | ○ | ○ |
| Example 3 | ○ | ○ | ○ | ○ | ○ |
| Example 4 | ○ | ○ | ○ | ○ | ○ |
| Example 5 | ○ | Δ | Δ | ○ | ○ |
| Example 6 | Δ | Δ | Δ | ○ | ○ |
| Example 7 | ○ | ○ | ○ | ○ | ○ |
| Example 8 | ○ | ○ | ○ | ○ | ○ |
| Example 9 | Δ | ○ | ○ | ○ | ○ |
| Example 10 | Δ | ○ | ○ | ○ | ○ |
| Example 11 | ○ | Δ | Δ | ○ | ○ |
| Example 12 | ○ | Δ | Δ | ○ | ○ |
| Example 13 | ○ | Δ | Δ | ○ | ○ |
| Comparative Example 1 | x | x | x | x | x |
| Comparative Example 2 | x | ○ | ○ | x | x |
| Comparative Example 3 | x | ○ | ○ | x | x |
| Comparative Example 4 | x | ○ | ○ | x | x |
| Comparative Example 5 | ○ | x | x | ○ | ○ |

TABLE 2-continued

|  | Electrode plate uniformity | Resistance | L* value | Adherence Before coating active material | Adherence After coating active material |
|---|---|---|---|---|---|
| Comparative Example 6 | x | x | x | x | x |
| Comparative Example 7 | x | x | x | x | x |
| Reference Example 1 | x | Δ | Δ | ○ | ○ |
| Reference Example 2 | x | Δ | Δ | ○ | ○ |

Referring to Table 2, the negative electrodes using carbon-based slurry including a carbon-based material, a first binder, and a thickener and herein, the first binder in a range of 35 wt % to 70 wt % according to Examples 1 to 13 showed all satisfactory or excellent electrode plate uniformity, resistance, and adherence.

On the other hand, the negative electrode using carbon-based slurry including no thickener according to Comparative Example 1 showed insufficient electrode plate uniformity, resistance, and adherence.

In addition, the negative electrodes including a binder in an amount of less than 35 wt % according to Comparative Examples 2 to 4, 6, and 7 showed insufficient and deteriorated electrode plate uniformity and adherence.

The negative electrodes including a binder in an amount of greater than 70 wt % according to Comparative Example 5 showed excellent electrode plate uniformity and adherence but insufficient resistance characteristics.

The negative electrode including a first binder in an amount of 35 wt % to 70 wt % but using a thickener having a polymerization degree of 2000 according to Reference Example 2 showed satisfactory resistance characteristics and excellent adherence but remarkably deteriorated electrode plate uniformity.

Experimental Example 6: Rate Capability

The rechargeable lithium battery cells according to Examples 2 to 3 and Comparative Examples 4 to 5 were respectively charged at a constant current of 0.7 C up to 4.35 V at room temperature of 25° C. and then, charged at a constant voltage of 4.35 V, and then, the charge was finished at 0.025 C. Subsequently, the cells were allowed to stand for 10 minutes, discharged at a constant current of 0.2 C down to 3.0 V, and then, discharged down to 0.5 C, 1.0 C, 1.5 C, and 2.0 C under the same charge condition, and their discharge capacity (%) was measured. The results are shown in FIG. 3. The results are shown in FIG. 2 and Table 3.

Figure 2:
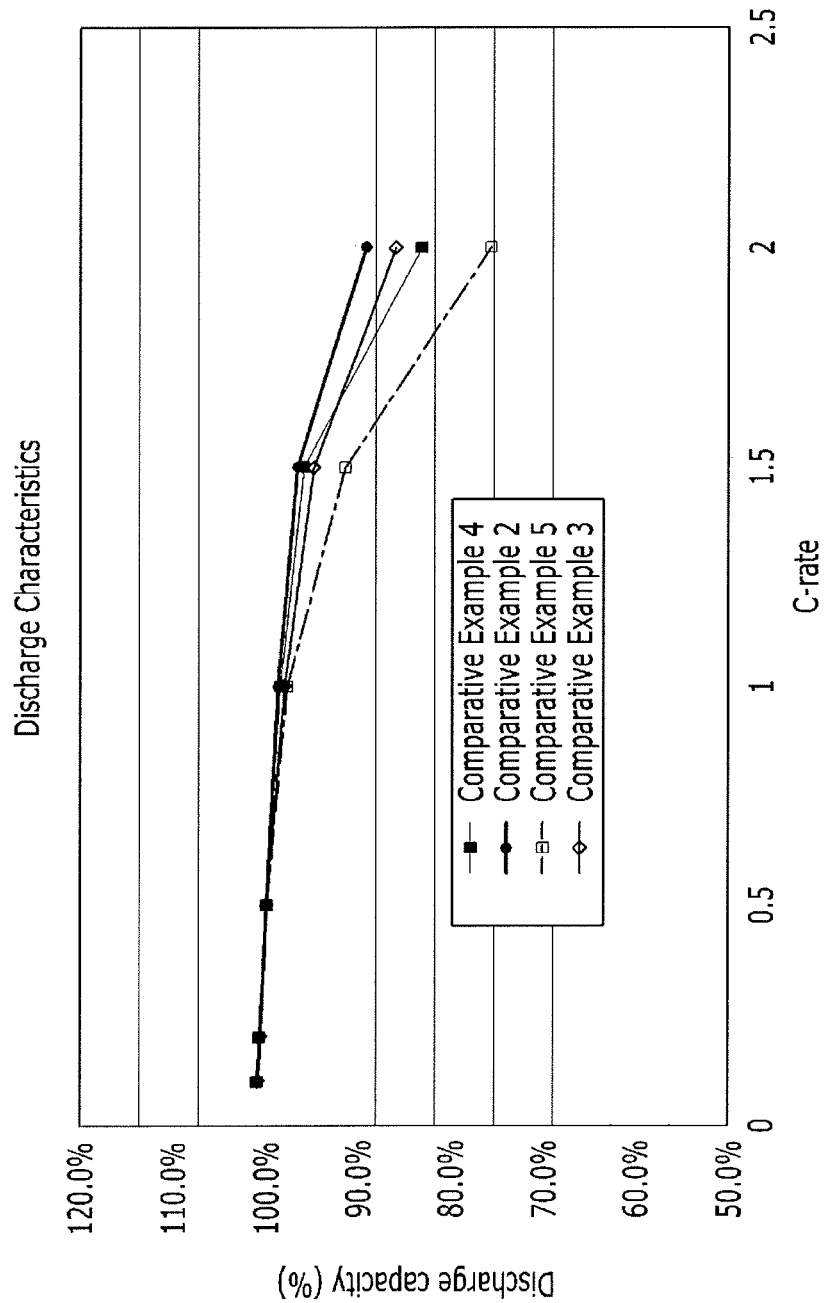
FIG. 2 illustrates rate capability measurement results of rechargeable lithium battery cells according to Examples 2 and 3 and Comparative Examples 4 and 5.
Figure 3:
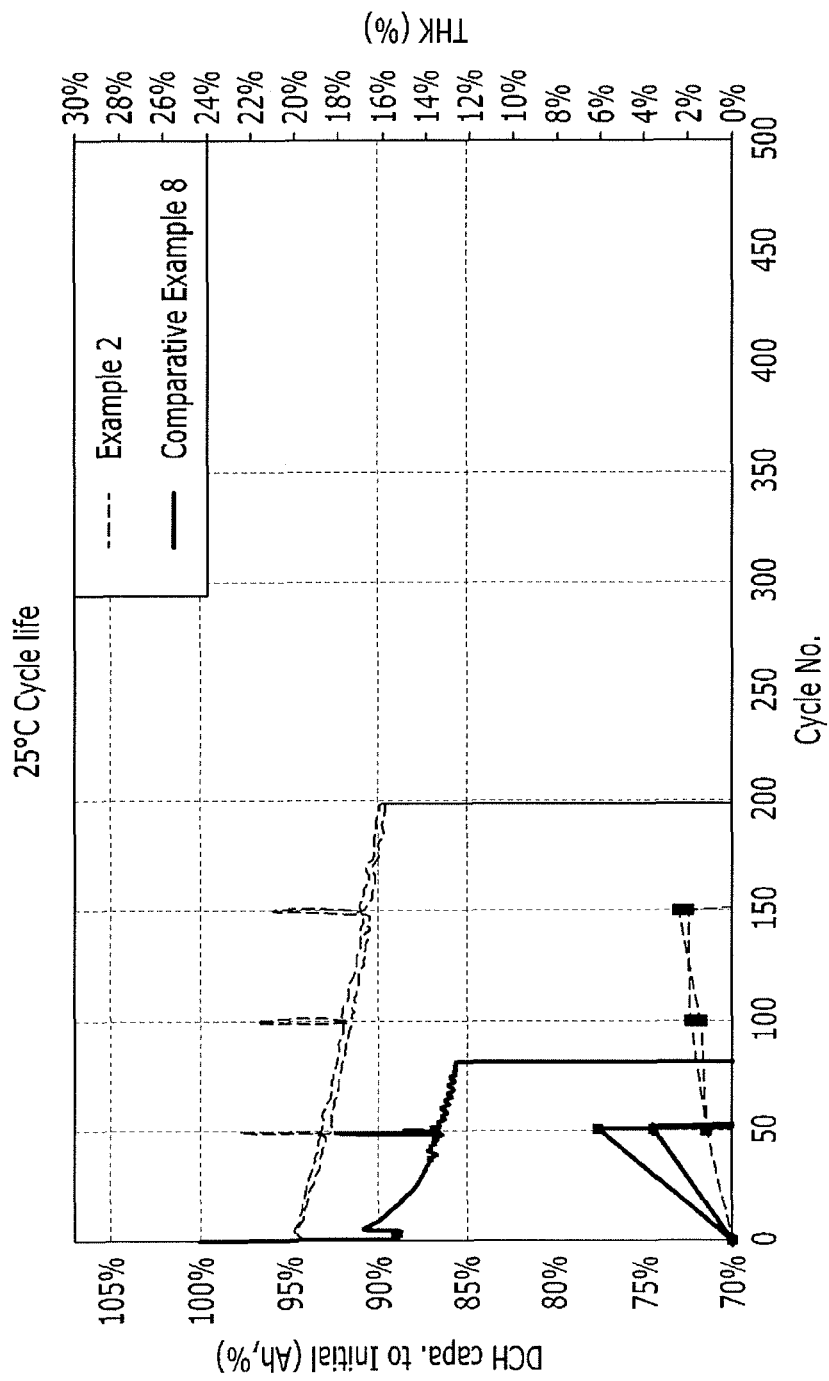
FIG. 3 illustrates cycle characteristics and swelling of rechargeable lithium battery cells according to Example 1 and Comparative Example 1.

In FIG. 2, C denotes a C-Rate, a charge and discharge current speed expressed as A (Ampere), which is in general displayed as a ratio relative to battery capacity. In other words, 1 C of each rechargeable lithium battery cell according to Examples 2 to 3 and Comparative Examples 4 to 5 denotes a current of 2030 mA.

TABLE 3

|  | C-Rate (Discharge) | | | | |
|---|---|---|---|---|---|
|  | 0.2 | 0.5 | 1.0 C | 1.5 C | 2.0 C |
| Example 2 | 100% | 100% | 98.7% | 96.5% | 89.2% |
| Example 3 | 100% | 100% | 98.6% | 95.9% | 86.0% |
| Comparative Example 4 | 100% | 100% | 98.1% | 94.9% | 83.3% |
| Comparative Example 5 | 100% | 100% | 97.7% | 91.5% | 75.8% |

Referring to FIG. 2 and Table 3, the rechargeable lithium battery cells according to Examples 2 to 3 and Comparative Examples 4 to 5 showed similar capacity up to 0.2 C and 0.5 C. However, the rechargeable lithium battery cells using a carbon-based coating layer including a first binder out of the range of the present disclosure according to Comparative Examples 4 and 5 showed sharply deteriorated capacity from 1.0 C. The rechargeable lithium battery cells using a carbon-based coating layer including a first binder within a range of 35 wt % to 70 wt % according to Examples 2 to 3 showed almost no capacity change compared with the cells according to Comparative Examples 4 and 5.

Experimental Example 7: Cycle Characteristics and Swelling

A cycle-life and a thickness increase rate of the rechargeable lithium battery cells of Example 2 and Comparative Example 8 at a high rate were measured.

The rechargeable lithium battery cells of Example 2 and Comparative Example 8 were charged at a constant current of 1 C up to 4.4 V and then, charged at a constant voltage of 4.4 V, and then, the charge was finished at 0.1 C. Subsequently, after allowed to stand for 10 minutes, the cells were discharged at a constant current of 1 C down to 3.0 V, and then, their cycle-lives were evaluated.

The recovery capacity of the rechargeable lithium battery cells at every 50 cycles was measured. In this case, the cells were charged at a constant current of 0.2 C up to 4.4 V and then, charged at a constant voltage of 4.4 V, and then, the charge was finished at 0.02 C. After allowed to stand for 10 minutes, the cells were discharged at a constant current of 0.2 C down to 2.75 V, and their recovery capacity was measured.

A thickness of the rechargeable lithium battery cells after a predetermined cycle was measured by using a digital indicator, 543-490B Model made by Mitutoyo Corp., and then compared with a thickness of the cells at the first cycle to calculate their thickness increase ratios % and thus to evaluate swelling characteristics. The results are shown in FIG. 3.

Referring to FIG. 3, the rechargeable lithium battery cell including a carbon-based coating layer according to Example 1 showed excellent capacity retention and recovery capacity despite rapid charges and discharges but an insignificant thickness increase ratio after measuring the cycle characteristics. On the contrary, the rechargeable lithium battery including no carbon-based coating layer according to Comparative Example 8 showed a sharply deteriorated cycle-life at high-rate charges and discharges and a high thickness increase after measuring their cycle characteristics.

By way of summation and review, research has been directed to reducing a charge time of a rechargeable lithium battery through rapid charging while improving the stability of the rechargeable lithium battery.

Embodiments provide an electrode for a rechargeable lithium battery having improved high-rate charge/discharge characteristics and stability and a rechargeable lithium battery including the same. Such characteristics and stability may be obtained by effectively controlling contact interface resistance between a current collector and an electrode active material layer during manufacture of an electrode.

For example, metal charge characteristics and stability of the rechargeable lithium battery may be improved in the manufacturing of a negative electrode by positioning a carbon-based coating layer between the current collector and the electrode active material layer and then applying the negative electrode to the rechargeable lithium battery. The carbon-based coating layer may be formed from a carbon-based slurry including a carbon-based material, a first binder, and a thickener.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. An electrode for a rechargeable lithium battery, the electrode comprising
   a current collector;
   an electrode active material layer on at least one surface of the current collector;
   a carbon-based coating layer between the current collector and the electrode active material layer, the carbon-based coating layer being formed from a carbon-based slurry including a carbon-based material, a first binder, and a thickener;
   wherein a content of the first binder is about 40 wt % to about 50 wt % based on the total weight of the carbon-based material, the first binder, and the thickener of the carbon-based coating layer,
   wherein a polymerization degree of the thickener is about 1,200 to about 1,500, and
   wherein a content of the thickener is about 3 wt % to about 10 wt %, based on the total weight of the carbon-based material, the first binder, and the thickener of the carbon-based coating layer.

2. The electrode as claimed as claim 1, wherein the first binder includes at least one selected from a styrene-butadiene rubber, a styrene-butyl acrylate copolymer and a styrene-(meth)acryl ester copolymer.

3. The electrode as claimed as claim 1, wherein the electrode is a negative electrode.

4. The electrode as claimed as claim 1, wherein a weight ratio of the carbon-based material and the first binder in the carbon-based coating layer is about 1:0.5 to about 1:1.9.

5. The electrode as claimed as claim 1, wherein a glass transition temperature of the first binder is about −40° C. to about 20° C.

6. The electrode as claimed as claim 1, wherein the carbon-based material is at least one selected from graphite, carbon black, acetylene black, ketjen black, channel black, furnace black, lamp black, thermal black, a carbon fiber and carbon fluoride.

7. The electrode as claimed as claim 1, wherein the thickener is at least one selected from carboxymethyl cellulose (CMC), polyvinyl alcohol (PVA), and sodium polyacrylate (Na-PA).

8. The electrode as claimed as claim 7, wherein the thickener is carboxymethyl cellulose (CMC) and a substitution degree of the thickener is about 0.5 to about 1.2.

9. The electrode as claimed as claim 1, wherein a thickness of the carbon-based coating layer is about 0.05 μm to about 3 μm.

10. The electrode as claimed as claim 1, wherein:
    the electrode active material layer includes a second binder, and
    the first binder and the second binder are the same material.

11. A rechargeable lithium battery, comprising:
    a positive electrode;
    a negative electrode; and
    an electrolyte solution,
    wherein the negative electrode is an electrode as claimed as claim 1.

* * * * *